United States Patent
Negulescu et al.

(10) Patent No.: US 10,633,101 B2
(45) Date of Patent: Apr. 28, 2020

(54) ASSEMBLY FOR AIRCRAFT COMPRISING ENGINES WITH BOUNDARY LAYER INGESTION PROPULSION

(71) Applicant: Airbus Operations SAS, Toulouse (FR)

(72) Inventors: Camil Negulescu, Toulouse (FR); Jean-Michel Rogero, Toulouse (FR); Renaud Faure, Blagnac (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 344 days.

(21) Appl. No.: 15/626,698

(22) Filed: Jun. 19, 2017

(65) Prior Publication Data

US 2017/0361939 A1  Dec. 21, 2017

(30) Foreign Application Priority Data

Jun. 20, 2016 (FR) ..................... 16 55719

(51) Int. Cl.

| | |
|---|---|
| *B64D 27/14* | (2006.01) |
| *B64C 39/04* | (2006.01) |
| *B64D 29/04* | (2006.01) |
| *B64D 27/20* | (2006.01) |
| *B64C 1/16* | (2006.01) |
| *B64C 5/02* | (2006.01) |

(Continued)

(52) U.S. Cl.
CPC ............... *B64D 27/14* (2013.01); *B64C 1/16* (2013.01); *B64C 5/02* (2013.01); *B64C 39/04* (2013.01); *B64D 27/20* (2013.01); *B64D 29/04* (2013.01); *B64D 33/02* (2013.01); *F02C 7/04* (2013.01); *B64C 21/02* (2013.01); *B64C 2001/0045* (2013.01); *B64D 2033/0226* (2013.01); *Y02T 50/44* (2013.01)

(58) Field of Classification Search
CPC ... B64C 1/16; B64C 2001/0045; B64C 21/02; B64C 39/04; B64C 5/02; B64D 2033/0226; B64D 27/14; B64D 27/20; B64D 29/04; B64D 33/02; F02C 7/04; Y02T 50/44
See application file for complete search history.

(56) References Cited

U.S. PATENT DOCUMENTS 2,988,301 A * 6/1961 Fletcher .............. B64C 29/0025
                                                    244/12.3
3,073,547 A * 1/1963 Fischer ............... B64C 29/0033
                                                    244/7 C (Continued)

FOREIGN PATENT DOCUMENTS

| DE | 2306811 | 8/1974 |
|---|---|---|
| GB | 2120623 | 12/1983 |
| WO | 2010049610 | 5/2010 |

OTHER PUBLICATIONS

French Search Report, dated Apr. 13, 2017, priority document.
"Innovation", Aviation Week & Space Technology, Jul. 19, 2015.

*Primary Examiner* — Medhat Badawi
(74) *Attorney, Agent, or Firm* — Greer, Burns & Crain, Ltd.

(57) ABSTRACT

In order to further benefit from the principle of boundary layer ingestion by engines of an aircraft assembly, the rear portion of the fuselage of this aircraft assembly includes a front portion which splits up into at least two distinct rear portions, spaced apart from each other, and each integrating the rotary ring of the receiver of one of the engines.

9 Claims, 7 Drawing Sheets

(51) Int. Cl.
*B64D 33/02* (2006.01)
*F02C 7/04* (2006.01)
*B64C 21/02* (2006.01)
*B64C 1/00* (2006.01)

(56) References Cited

U.S. PATENT DOCUMENTS

| | | | | |
|---|---|---|---|---|
| 3,136,499 | A * | 6/1964 | Kessler | B64C 29/0033 244/7 C |
| 3,181,810 | A * | 5/1965 | Olson | B64C 29/0033 244/7 R |
| 3,592,415 | A * | 7/1971 | Walley | B64C 1/00 244/55 |
| 3,820,746 | A * | 6/1974 | Vedova | B64C 29/0016 244/55 |
| 3,972,490 | A * | 8/1976 | Zimmermann | B64C 29/0016 244/12.3 |
| 3,995,794 | A * | 12/1976 | Lanier | B64C 15/02 244/12.4 |
| 4,030,688 | A * | 6/1977 | Pellarini | B64C 39/00 244/13 |
| 4,492,353 | A * | 1/1985 | Phillips | B64C 29/0075 244/12.4 |
| 4,500,055 | A | 2/1985 | Korjer | |
| 4,966,338 | A * | 10/1990 | Gordon | B64C 23/06 244/130 |
| 5,115,996 | A * | 5/1992 | Moller | B64C 29/0025 239/265.19 |
| D389,111 | S * | 1/1998 | Flattery | D12/190 |
| 5,779,191 | A * | 7/1998 | Brislawn | B64C 5/02 244/194 |
| 5,957,405 | A * | 9/1999 | Williams | B64C 1/00 244/15 |
| 6,134,876 | A * | 10/2000 | Hines | F02C 3/10 60/39.41 |
| 6,394,389 | B1 * | 5/2002 | Saiz | B64C 7/02 244/91 |
| 7,107,756 | B2 * | 9/2006 | Rolt | F02K 3/06 60/224 |
| 7,967,243 | B2 * | 6/2011 | Verde Preckler | B64C 15/12 244/56 |
| 8,313,055 | B2 * | 11/2012 | Gall | B64D 27/02 244/1 N |
| 8,573,531 | B2 * | 11/2013 | Cazals | B64D 27/20 244/54 |
| 8,579,230 | B2 * | 11/2013 | Diochon | B64D 29/04 244/54 |
| 8,651,414 | B2 * | 2/2014 | Cazals | B64C 1/068 244/13 |
| 8,684,302 | B2 * | 4/2014 | Chanez | B64C 1/0009 244/53 B |
| 9,266,605 | B2 * | 2/2016 | Richter | B64D 45/0005 |
| 9,346,551 | B2 * | 5/2016 | Stretton | B64D 27/14 |
| 9,567,062 | B2 * | 2/2017 | Chandler | B64C 5/06 |
| 9,573,693 | B2 * | 2/2017 | Cazals | B64C 39/12 |
| 9,845,159 | B2 * | 12/2017 | Suciu | B64D 27/20 |
| 9,884,674 | B2 * | 2/2018 | Suciu | B64C 5/02 |
| 10,112,696 | B2 * | 10/2018 | Chandler | B64D 25/00 |
| 10,435,163 | B2 * | 10/2019 | Gallet | F02C 6/02 |
| 2002/0189230 | A1 * | 12/2002 | Franchet | F02K 3/025 60/204 |
| 2008/0245925 | A1 * | 10/2008 | Udall | B64C 5/02 244/52 |
| 2009/0229243 | A1 * | 9/2009 | Guemmer | B64D 27/12 60/226.1 |
| 2014/0021292 | A1 * | 1/2014 | West | F02C 7/20 244/54 |
| 2014/0117152 | A1 * | 5/2014 | Suciu | F02K 3/06 244/54 |
| 2014/0130512 | A1 * | 5/2014 | Chouard | B64D 27/14 60/797 |
| 2014/0183296 | A1 * | 7/2014 | Suciu | F02K 3/06 244/54 |
| 2014/0260182 | A1 * | 9/2014 | Suciu | F02C 3/10 60/224 |
| 2015/0292411 | A1 * | 10/2015 | Suciu | F02C 7/20 60/805 |
| 2015/0298794 | A1 * | 10/2015 | Suciu | F02K 1/62 244/45 R |
| 2015/0298814 | A1 * | 10/2015 | Suciu | F02K 1/62 244/110 B |
| 2016/0010589 | A1 * | 1/2016 | Rolt | F01D 13/003 60/226.1 |
| 2016/0017844 | A1 * | 1/2016 | Suciu | F02K 1/60 244/53 B |
| 2016/0076447 | A1 * | 3/2016 | Merlo | F01D 25/285 60/39.12 |
| 2016/0229532 | A1 * | 8/2016 | Shapery | B64C 29/0075 |
| 2017/0121031 | A1 * | 5/2017 | Stieger | B64C 21/06 |
| 2017/0137134 | A1 * | 5/2017 | Vessot | B64D 27/12 |
| 2017/0137135 | A1 * | 5/2017 | Chanez | B64D 27/18 |
| 2017/0167437 | A1 * | 6/2017 | Cazals | F02K 1/52 |
| 2017/0313430 | A1 * | 11/2017 | Pautis | B64C 11/30 |
| 2017/0361939 | A1 * | 12/2017 | Negulescu | B64C 1/16 |
| 2018/0037331 | A1 * | 2/2018 | Suciu | B64D 27/14 |

* cited by examiner

ASSEMBLY FOR AIRCRAFT COMPRISING ENGINES WITH BOUNDARY LAYER INGESTION PROPULSION

CROSS-REFERENCES TO RELATED APPLICATIONS

This application claims the benefit of the French patent application No. 1655719 filed on Jun. 20, 2016, the entire disclosures of which are incorporated herein by way of reference.

BACKGROUND OF THE INVENTION

The present invention pertains to the field of aircraft comprising a rear portion of the fuselage equipped with engines with boundary layer ingestion propulsion. As is known, boundary layer ingestion propulsion corresponds to the engines taking in an air flow with weak kinetic energy, circulating around the rear portion of fuselage. This technique reduces the kinetic energy expended for the propulsion as well as the drag of the aircraft, with the result of less fuel consumption.

It is known how to attach, in the rear portion of the fuselage, engines with boundary layer ingestion propulsion. For example, this involves two half-sunken engines placed side by side, protruding upward or to the side from the rear portion of fuselage.

However, in this type of configuration, the two engines are only able to take in one portion of the boundary layer of air circulating on the rear portion of fuselage. For these configurations, the boundary layer is also taken in without axial symmetry in relation to the air inlet axis, thus generating a distortion of the incoming flow of the engine.

Thus, there is a need for optimization in order to better profit from the principle of boundary layer ingestion propulsion.

SUMMARY OF THE INVENTION

In order to meet this need at least in part, the invention concerns an assembly for aircraft comprising a rear portion of fuselage as well as at least two engines with propulsion by boundary layer ingestion circulating on the rear portion of fuselage, each engine comprising a receiver equipped with a rotary ring from which bladed elements project radially to the outside. According to the invention, the rear portion of fuselage includes a front portion which splits up into at least two distinct rear portions spaced apart from each other and each integrating the rotary ring of one of the engines.

The invention thus calls for a separation of the fuselage into several rear portions, each of which is associated with an engine, such that its receiver can take in all of the boundary layer circulating on its associated rear portion. This results advantageously in better overall performance of the aircraft.

The invention also calls for the implementation of the following optional characteristics, taken by themselves or in combination.

Each rear portion comprises in succession, from front to rear:
 a front piece of fuselage with shape converging toward the rear;
 the rotary ring; and
 a rear piece.

The receivers of the engines are spaced apart from each other along a transverse direction and/or along a height direction of the assembly. Optionally, the two receivers of the two engines are spaced apart from each other along a longitudinal direction, such that a distance between the two parallel longitudinal axes of the two distinct rear portions respectively bearing the two receivers, is less than the sum of a radius of the bladed elements of one of the two receivers and a radius of the bladed elements of the other receiver.

Each engine comprises a gas generator driving the receiver of the engine, the gas generator comprising a compressor assembly, a combustion chamber and a turbine assembly, the gas generator being preferably disposed in front of the receiver. Alternatively, the gas generator could be placed behind the receiver.

By another possibility, each receiver may also be driven by an electric motor.

Each engine preferably has an inverted design in which the turbine assembly is situated in front of the compressor assembly, orifices for evacuation of exhaust gases through the rear portion of fuselage being preferably disposed in front of the gas generator.

For two engines facing each other, the respective longitudinal axes of the two gas generators are inclined with respect to a longitudinal direction of the assembly, such that a distance separating the two compressor assemblies is less than a distance separating the two turbine assemblies.

The respective longitudinal axes of the two gas generators are inclined with respect to the longitudinal direction of the assembly, such that the turbine disks of the turbine assembly of one of the engines are inscribed in imaginary transverse turbine planes which do not intercept the gas generator of the other of the engines, and vice versa.

Each receiver is an uncased propeller whose blades preferably have a variable timing.

Alternatively, each receiver is a fan surrounded by a nacelle joined to the associated rear portion of fuselage, by means of front support arms and/or outlet guide vanes.

Each nacelle is structural and designed in order to ensure a transmission of the forces coming from one or more empennages of the assembly, in the direction of the associated rear portion of fuselage, and/or the assembly comprises at least one force transfer beam between an empennage and the rear portion of fuselage.

The nacelles are mechanically joined to each other.

Each nacelle comprises thrust reversal means, preferably comprising thrust reversal grids covered by one or more mobile cowls.

The assembly comprises two empennages.

Preferably, the two empennages and the nacelles have the same imaginary transverse plane of the assembly passing through them.

Finally, the invention also concerns an aircraft comprising an assembly such as the one described above, the aircraft being preferably of commercial type.

Other advantages and characteristics of the invention will appear in the following detailed and nonlimiting description.

BRIEF DESCRIPTION OF THE DRAWINGS

This description shall be given with respect to the appended drawings, among which.

DETAILED DESCRIPTION OF THE PREFERRED EMBODIMENTS

Figure 1:
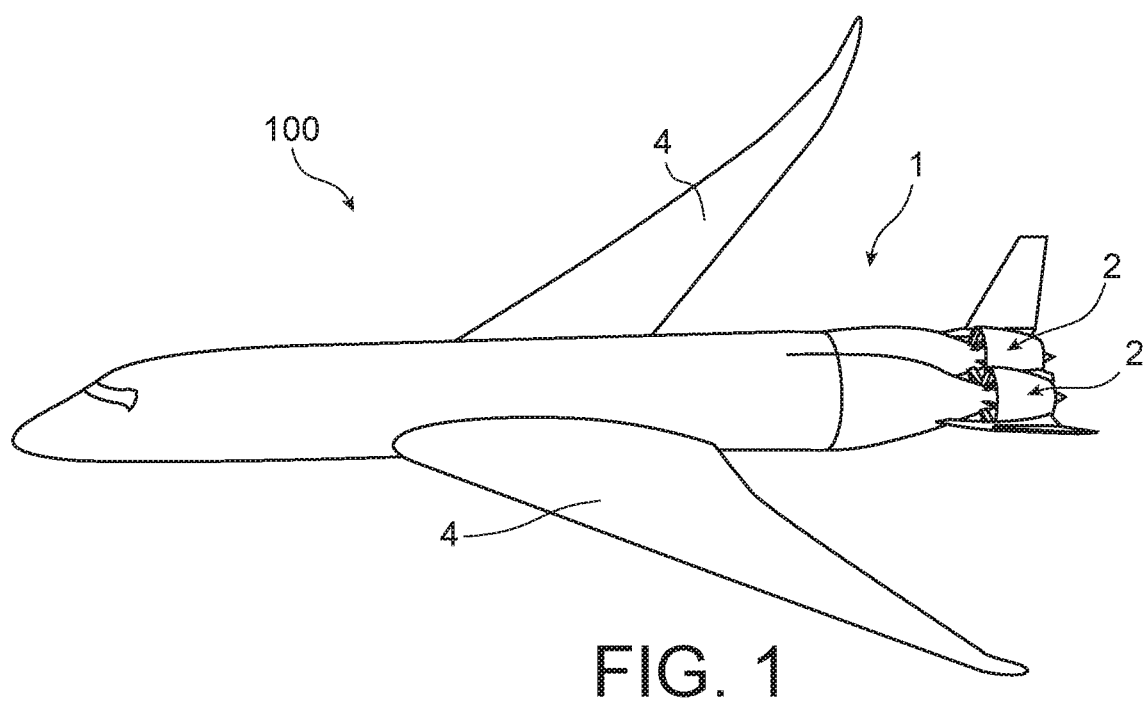
FIG. 1 represents a perspective view of an aircraft according to the invention.
Figure 2:
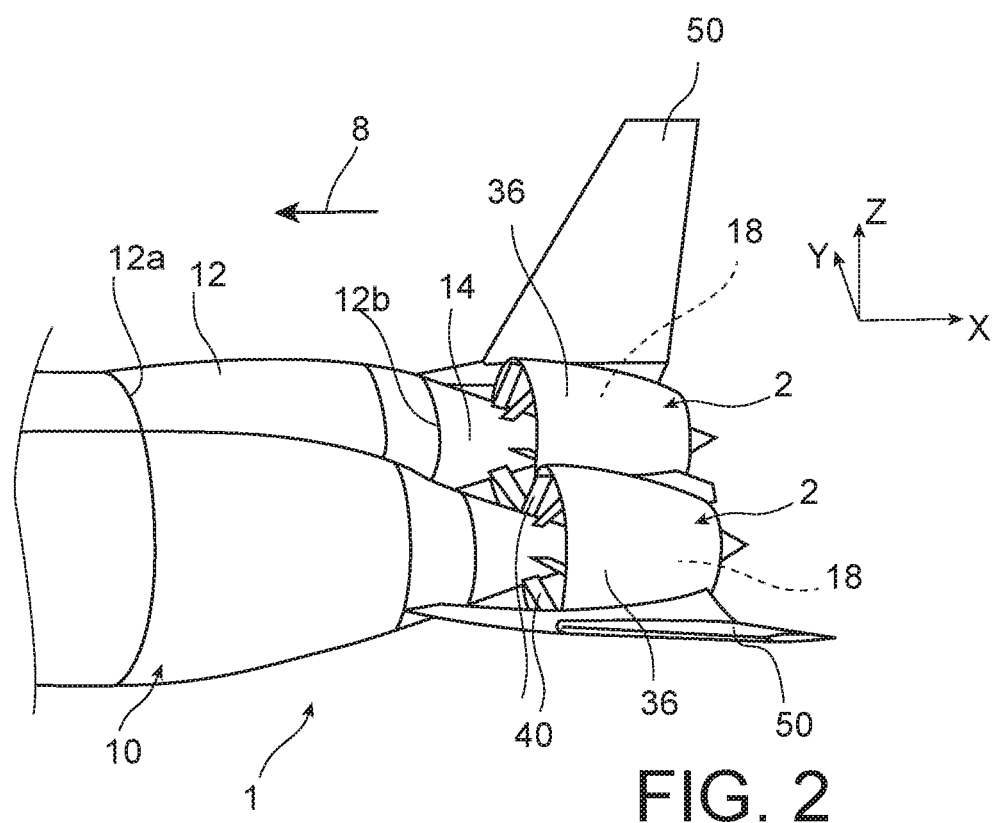
FIG. 2 represents an enlarged perspective view of an assembly according to one preferred embodiment of the invention, the assembly belonging to the aircraft shown in the preceding figure.

Referring first of all to FIG. 1, there is represented an aircraft 100 of the commercial type, comprising an assembly 1 corresponding to its rear end, provided with engines 2. On this aircraft, the wings 4 are not equipped with engines, even though this could be the case, without departing from the scope of the invention. The engines 2 are only disposed on the assembly 1, one preferred embodiment of which shall now be described with reference to FIGS. 2 to 6. In these figures, the terms "front" and "rear" should be considered in regard to a direction of movement 8 of the aircraft, due to the thrust generated by the engines 2.

The assembly 1 comprises a rear portion of fuselage 10, forming the rear end of the fuselage of the aircraft. This portion 10 comprises a front portion 12 whose one front end 12a has a fuselage shape, which may be, for example, oval, circular, or the like.

Moving in the direction of its rear end 12b, the front portion 12 is progressively pinched at its center until it splits into two distinct rear portions of fuselage, referenced 14. The two rear portions 14, preferably of identical solid of revolution shape, are spaced apart from each other in a transverse direction Y of the assembly. In this context, it is noted that, by convention, the X direction corresponds to the longitudinal direction of the assembly 1, which is likewise equated to the longitudinal direction of each engine of this assembly 1. This direction X is parallel to a longitudinal axis 5 of each engine 2. On the other hand, the direction Y corresponds to the direction oriented transversely with respect to the assembly 1 and likewise equated to the transverse direction of each engine, while the direction Z corresponds to the vertical or height direction. These three directions X, Y and Z are orthogonal to each other and form a direct trihedron.

Each rear portion 14 is designed to integrate all or some of one of the engines 2. Consequently, in the preferred embodiment which calls for two engines spaced apart along the direction Y, two rear portions 14 are provided. In a different case where a third engine will be added, spaced apart from the first two along each of the directions Y and Z so as to make a triangle arrangement, there will then be provided three rear portions of fuselage. In the case of four engines, these may be arranged in a square or a rectangle, being integrated respectively in four rear portions of fuselage 14.

In the preferred embodiment represented in FIGS. 2 to 6, there are thus provided two rear portions of fuselage 14 spaced apart from each other along the direction Y, and running in parallel along the direction X, starting from the rear end 12b of the portion of fuselage 12. Starting from this rear end 12b, each rear portion 14 has, first of all, a front piece 14-1 which narrows, for example in a truncated conical or similar shape, converging toward the rear. This portion 14 then integrates an element of its associated engine 2, such as will be explained below, and then terminates toward the rear with a rear piece 14-2 of circular cross section and substantially constant diameter, of bullet shape, converging shape, or more complex shape.

Figure 4:
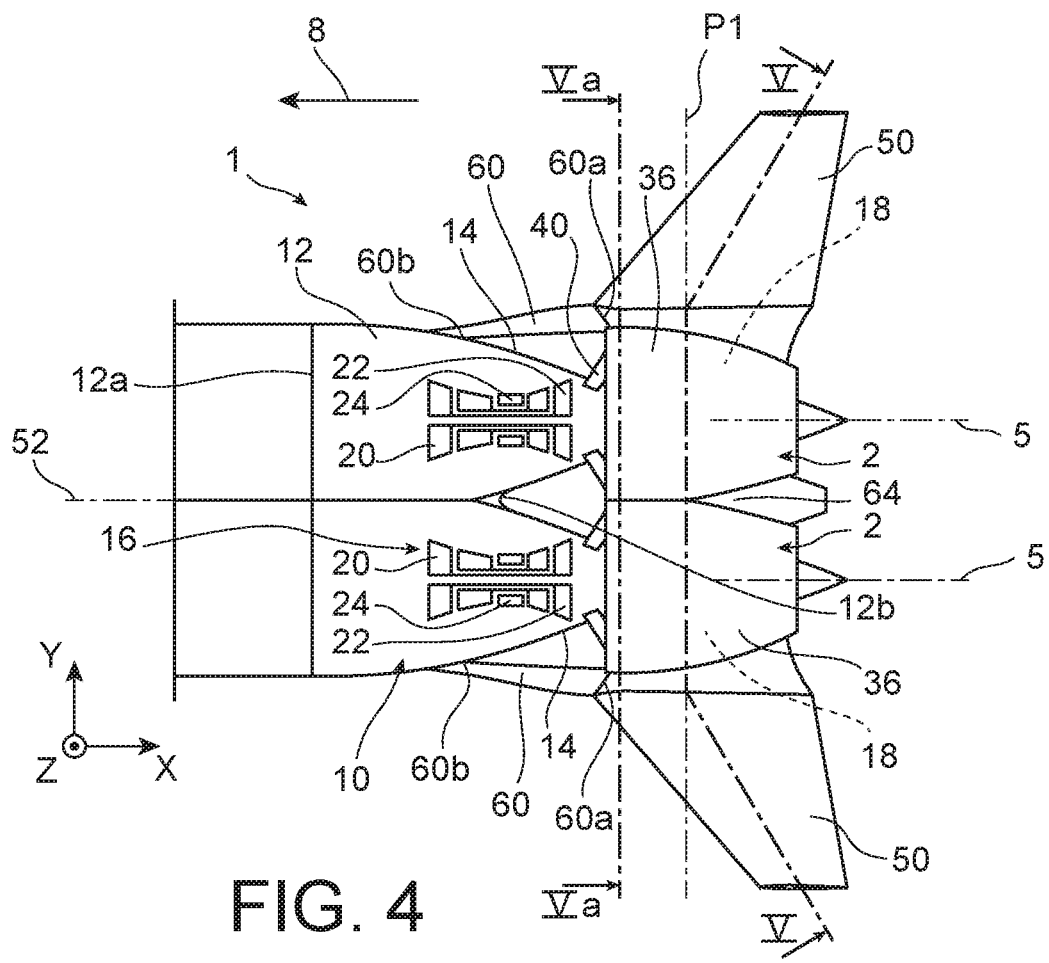
FIG. 4 is a top view of the assembly shown in FIG. 2.

In this preferred embodiment, each rear portion of fuselage 14 is centered on the longitudinal axis 5 of its associated engine 2. Each engine here is of the turbojet type with propulsion by boundary layer ingestion circulating on the corresponding rear portion of fuselage 14. Referring more precisely to FIG. 4, each engine 2 is thus equipped with a gas generator 16 driving a receiver 18. The generator 16 is disposed in front of the receiver 18, which allows it to be integrated in whole or in part inside the converging front piece 14-1 of the rear portion of the fuselage 14. This avoids the presence of a substantial weight at the rear end of the aircraft, and facilitates the balancing of the latter while reducing the balancing drag.

The gas generator 16 has a so-called inverted design, in which a turbine assembly 20 is arranged in front of a compressor assembly 22, with a combustion chamber 24 located between the two. As is shown schematically in FIG. 6, this makes it possible to arrange orifices 28 for evacuation of the hot gases coming from the turbine assembly 20, upstream from the generator. These orifices 28 pass through the front fuselage piece 14-1, thus assuming a forward position, which offers several advantages.

First of all, as for the hot gases being ejected far upstream by the orifices 28, their cooling is promoted by mixing with the ambient air for a substantial length, before any impacting of these gases on rear portions of the aircraft.

Moreover, this far upstream, disposition of the orifices 28 simplifies the use of energy recuperation systems, which has the benefit of increasing the efficiency of the engine and generating power for the aircraft cabin.

Figure 3:
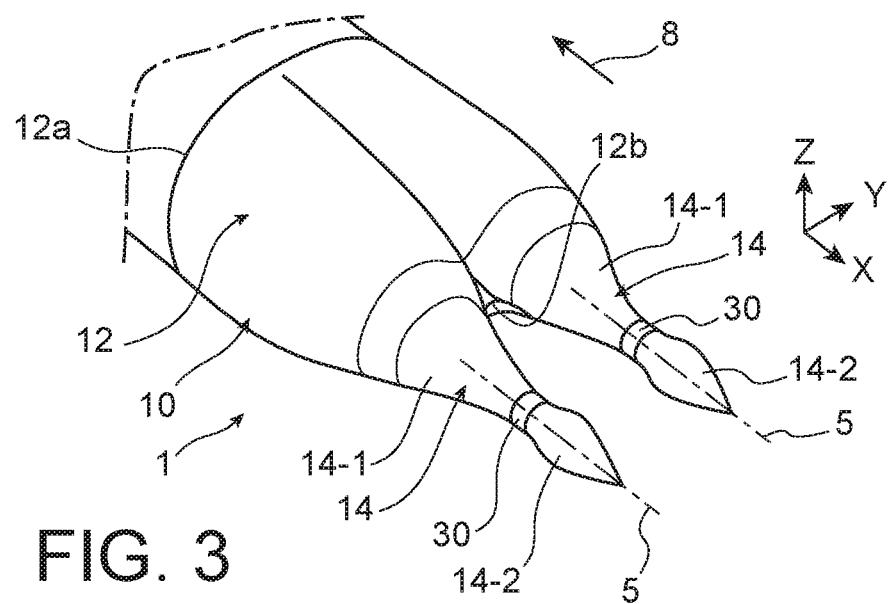
FIG. 3 is a perspective view similar to that of FIG. 2, specifically showing the rear portions of fuselage of the assembly.

The receiver here is a turbine fan, comprising a rotary ring 30, also known as a fan hub, from which bladed elements 32 project, also known as fan blades. It is the rotary ring 30 which is integrated in the rear part of the fuselage 14, being interposed between the two pieces 14-1, 14-2 and ensuring an aerodynamic continuity between them, as is best seen in FIG. 3. This allows the fan to take in all of the boundary layer circulating about the rear portion of fuselage 14, over 360°. Thus, the boundary layer is taken in with axial symmetry relative to the air inlet axis, thus preventing any distortion of the incoming flow of the engine which might have the consequence of reducing the efficiency of the fan, and of increasing the risk of operational problems with this fan.

The fan 18 is surrounded by a structural nacelle 36 joined mechanically to the front piece 14-1 by radial support arms 40 spaced apart from each other circumferentially, and joined mechanically to the rear piece 14-2 by outlet guide vanes 42, or OGV. Each of the two nacelles 36 may likewise have an orientable fan nozzle, i.e., one which can be piloted vertically and horizontally, to generate a vectorial thrust.

In FIG. 3, it is shown that the two rear portions of fuselage 14 have the same length, and the two rotary rings 30 are arranged in a same transverse plane. Even so, in one alternative embodiment shown in FIG. 3a, the two rotary rings 30 could be axially staggered with respect to each other, so that the bladed elements 32 of one of the engines are axially offset from the bladed elements 32 of the other engine. These bladed elements 32 may thus be partially superimposed in the axial direction. In other words, this makes it possible to bring closer together the two rear portions of fuselage 14, the distance Ds separating their two parallel longitudinal axes 5 then being able to be less than the sum of the radius R1 of the bladed elements 32 of one of the engines, and the radius R2 of the bladed elements 32 of the other engine.

Figure 3A:
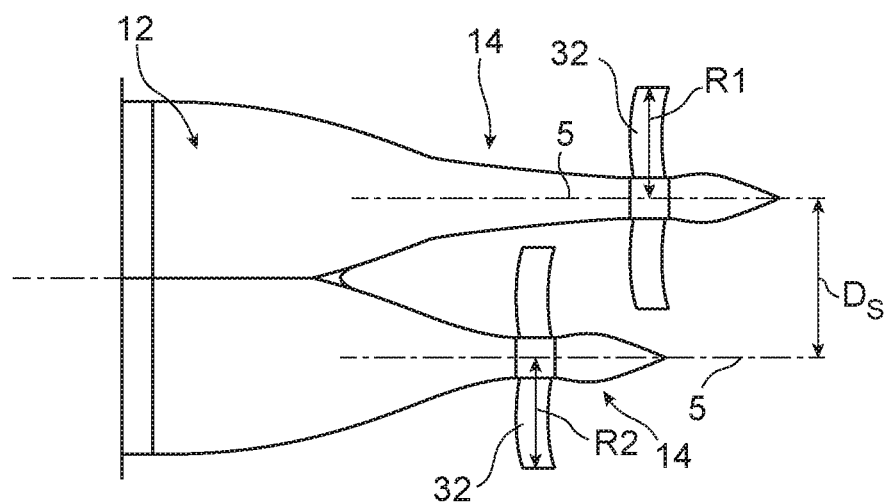
FIG. 3a is a view similar to that of FIG. 3, in a top view, showing one alternative embodiment.

In this context, it is noted that the embodiment shown in FIG. 3a has a longitudinal offset for two engines spaced apart from each other in the transverse direction, in a horizontal plane. Even so, this embodiment might likewise be applied to two engines spaced apart from each other in the vertical direction.

Figure 5:
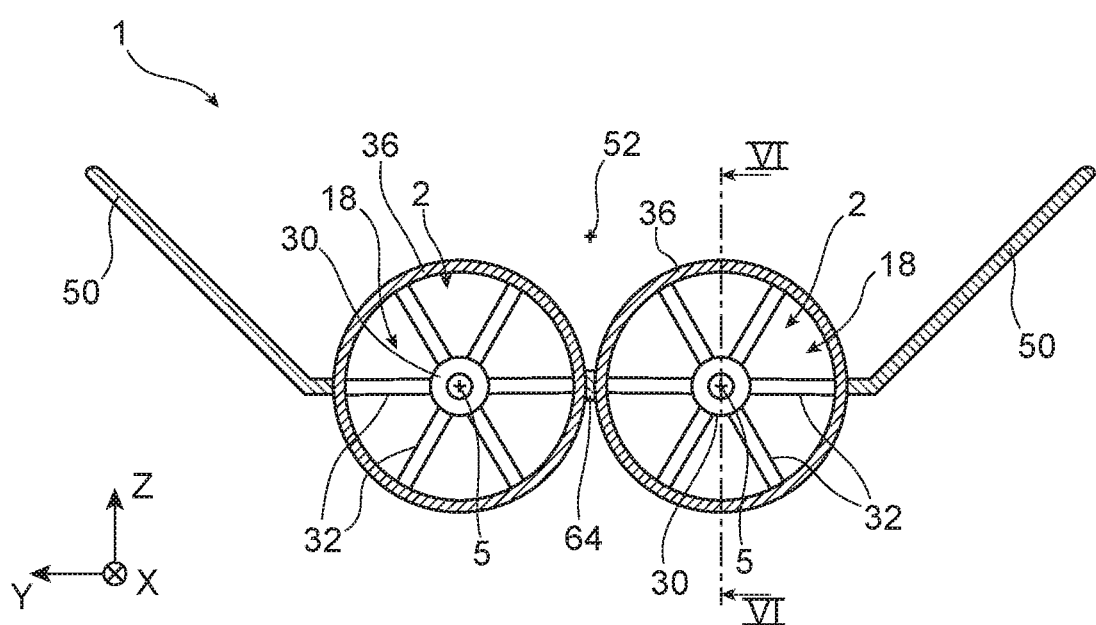
FIG. 5 is a cross-sectional view taken along the line V-V of FIG. 4.

FIGS. 4 and 5 show that there are provided two empennages 50 for the assembly 1, arranged on either side of the engines 2. A solution with one empennage or a number of empennages greater than two may likewise be contemplated, without departing from the scope of the invention.

In the invention, the two empennages 50 are not necessarily vertical, but may be inclined so as to depart from a central axis 52 of the assembly 1, running upward. In this case, the two empennages are said to have a V-shape. However, other dispositions can be used, such as a T shape disposition, shown in FIG. 5b, or by providing double empennages as shown in FIG. 5c. In this latter embodiment, also called a "twin-tail," on either side of the rear structure of the aircraft, there are provided two empennages 50, respectively substantially vertical and substantially horizontal, or instead slightly inclined with respect to the vertical and horizontal directions. Finally, another possibility represented in FIG. 5d comprises attaching conventional empennages 50 to the nacelles, in whole or in part. For example, the central empennage is likewise attached partly to the fuselage, to the front of the nacelles.

The two empennages 50 and the two nacelles 36 are substantially aligned transversely, having the same imaginary transverse plane P1 of the assembly 1 passing through them.

In order to once again take up forces coming from each of the two empennages 50, there is provided a beam 60 associated with each engine 2, extending generally in the direction X. In the area of its rear end 60a, the beam joins a front end of the empennage 50 to a front structural part of the nacelle 36, which can thus ensure the transmission of the forces coming from the empennage 50, in the direction of the pieces 14-1, 14-2 via the support arms 40 and the outlet guide vanes 42.

Moreover, the front end 60b of the beam 60 is connected to the front piece 14-1 of fuselage, which makes it possible to provide a different path for forces between the empennage 50 and this piece 14-1. Moreover, it is noted that, in a rear portion, the two nacelles are likewise joined mechanically to each other by a material ligament 64.

Figure 5A:
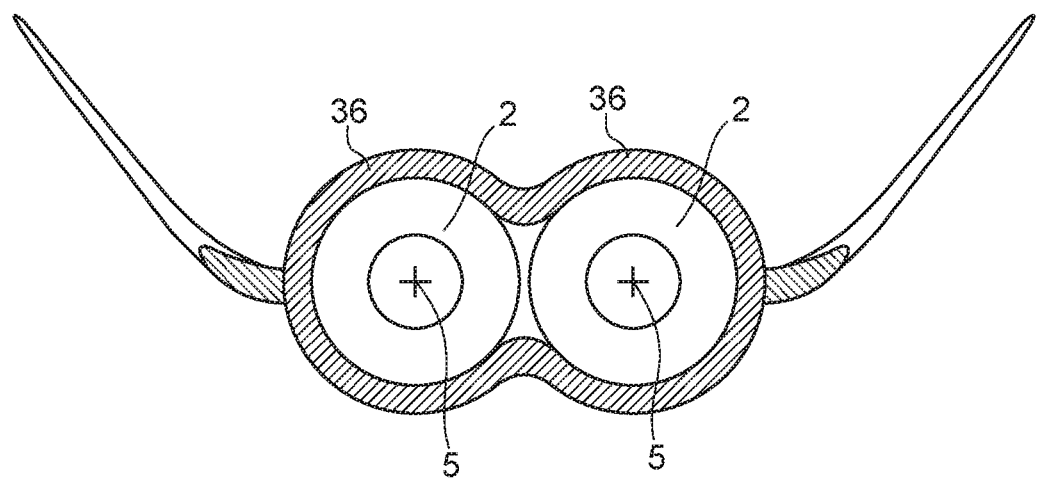
FIG. 5a is a cross-sectional view taken along the line Va-Va of FIG. 4.
Figure 5B:
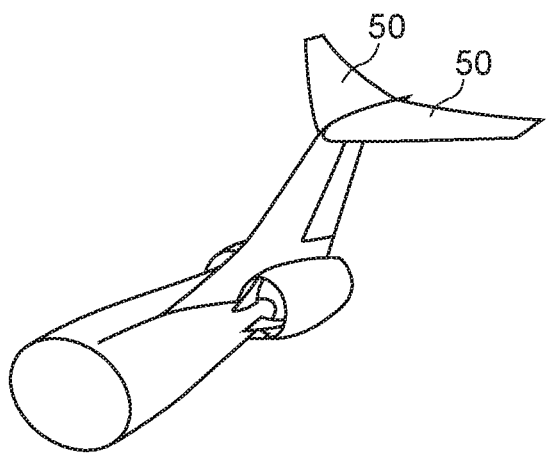
FIGS. 5b to 5d show perspective views of other configurations of empennages.
Figure 5C:
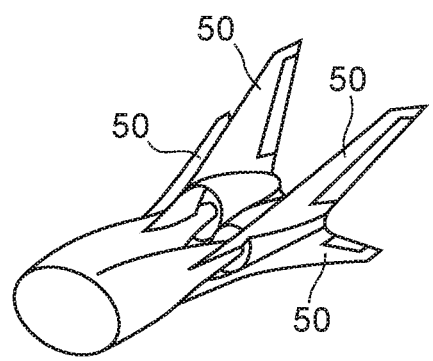
Figure 5D:
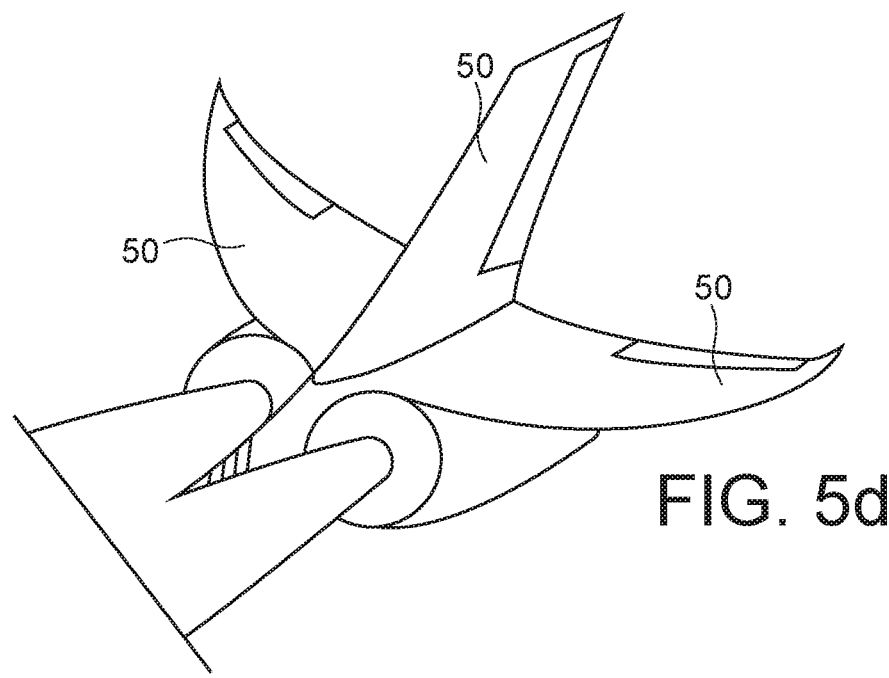
Figure 6:
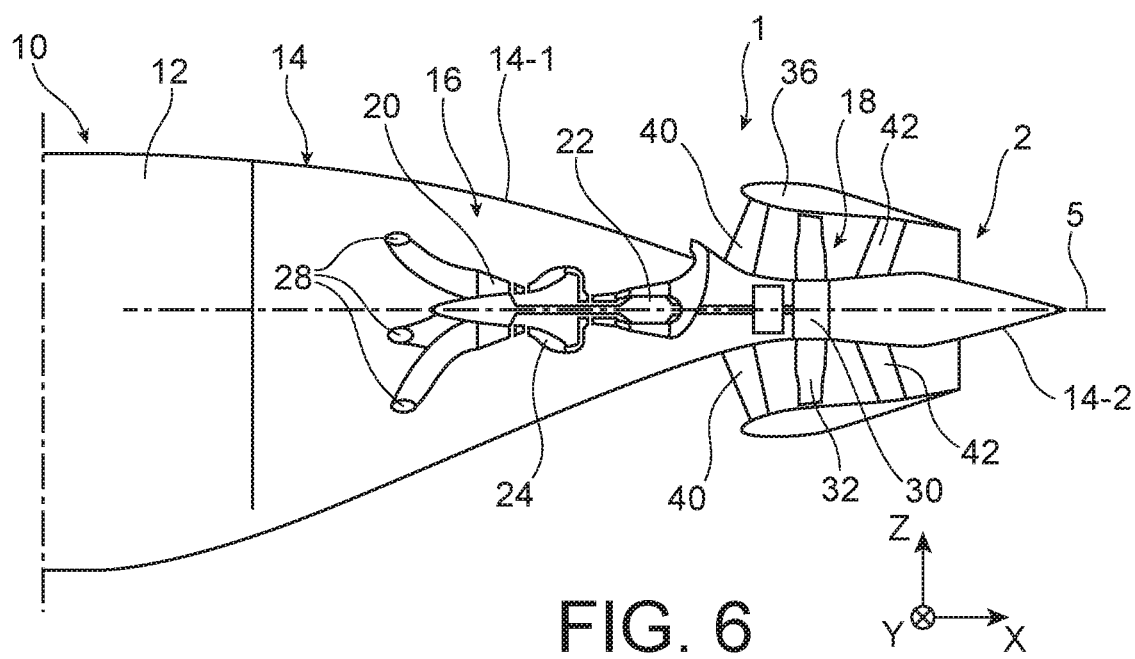
FIG. 6 is a cross-sectional view taken along the line VI-VI of FIG. 5.

It is likewise noted, referring to FIG. 5a, that the two nacelles 36 may be partly merged near the rear ends 60a. In other words, they do not each extend for 360°, but rather are joined to each other at two points on a lesser angular sector so as to form only a single structure, preferably with a shape pinched vertically at its center.

Figure 7:
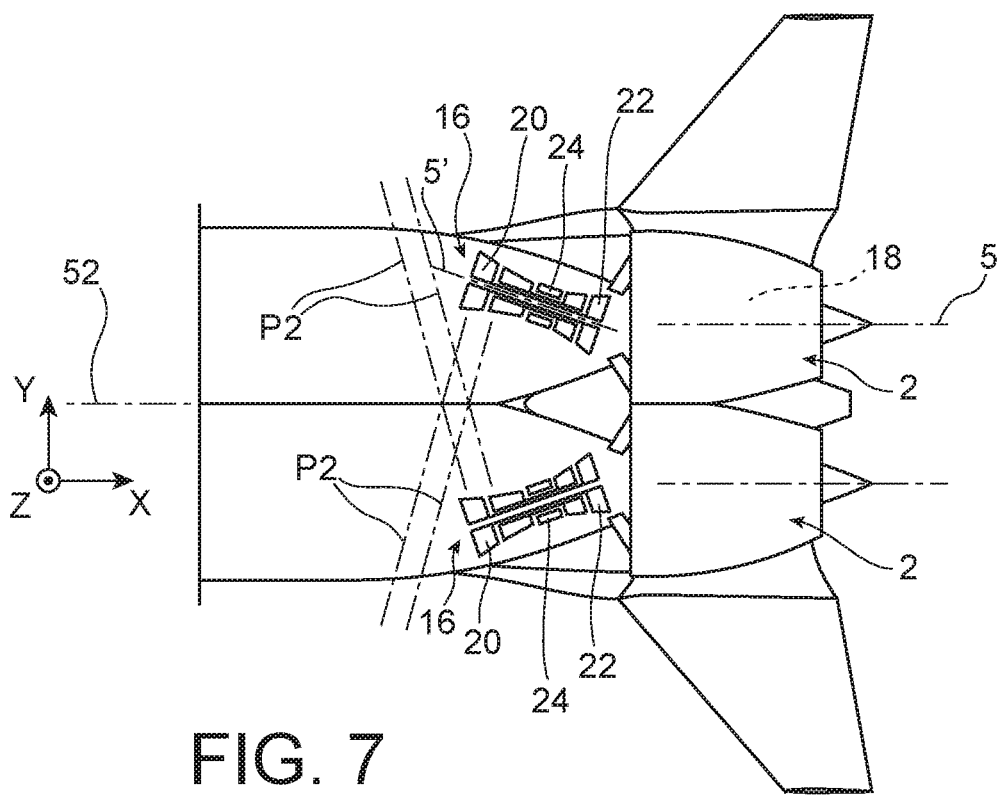
FIG. 7 is a top view of an assembly according to another preferred embodiment of the invention.

In the embodiment shown in FIG. 7, another benefit comes from the fact that the gas generator 16 is situated in the front piece of fuselage 14-1 with shape converging toward the rear. In fact, this makes it possible to tilt the gas generator, providing longitudinal axes of generators 5' which are no longer merged with the longitudinal axis 5 of the fan, but rather inclined relative to them.

The two inclinations, preferably being symmetrical, are such that the gas generators 16 make away from the central axis 52 in the forward direction, which means that a separation distance between the two compressor assemblies 22 is less than a separation distance between the two turbine assemblies 20. In other words, the two gas generators 16 are arranged in a V, symmetrically with respect to a median longitudinal plane of the assembly.

This makes it possible to have the turbine disks of the turbine assembly 20 of each engine 2 inscribed in the imaginary transverse turbine planes P2 not intercepting the gas generator 16 of the other engine. Thanks to this feature, the managing of the risk of break-up of the propeller blades, also known as the UERF or "Uncontained Engine Rotor Failure" risk, is facilitated. In fact, it is no longer necessary to provide a specific shield between the two gas generators, which advantageously allows a reduction in the overall weight of the assembly.

Figure 8:
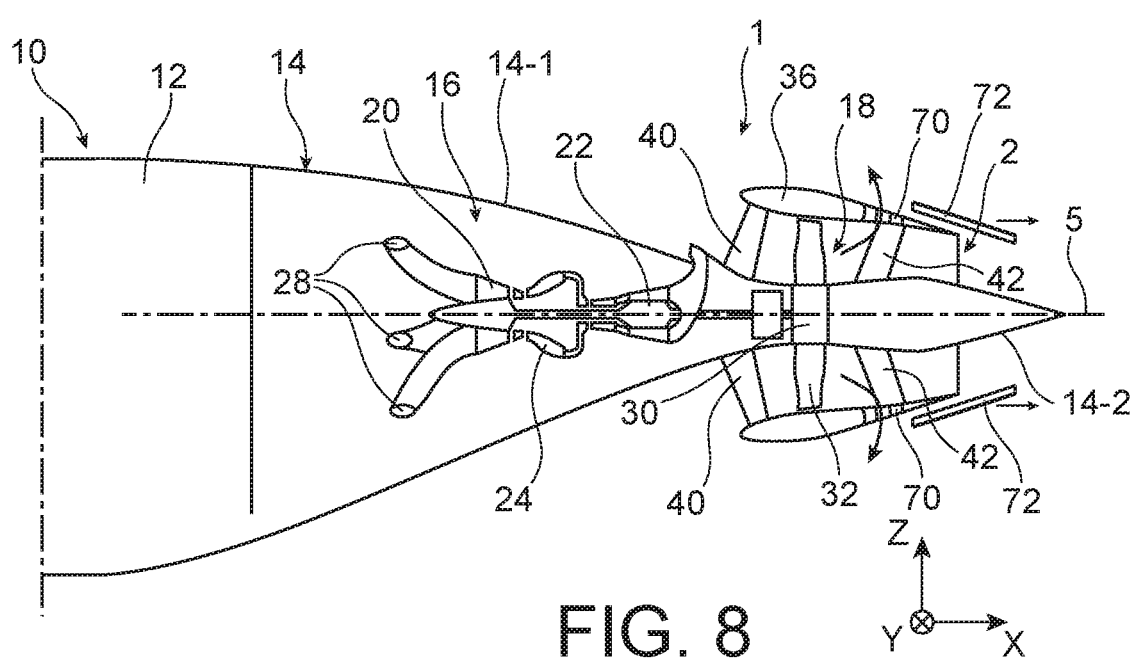
FIG. 8 is a cross-sectional view similar to that of FIG. 6, showing thrust reversal means.
Figure 9:
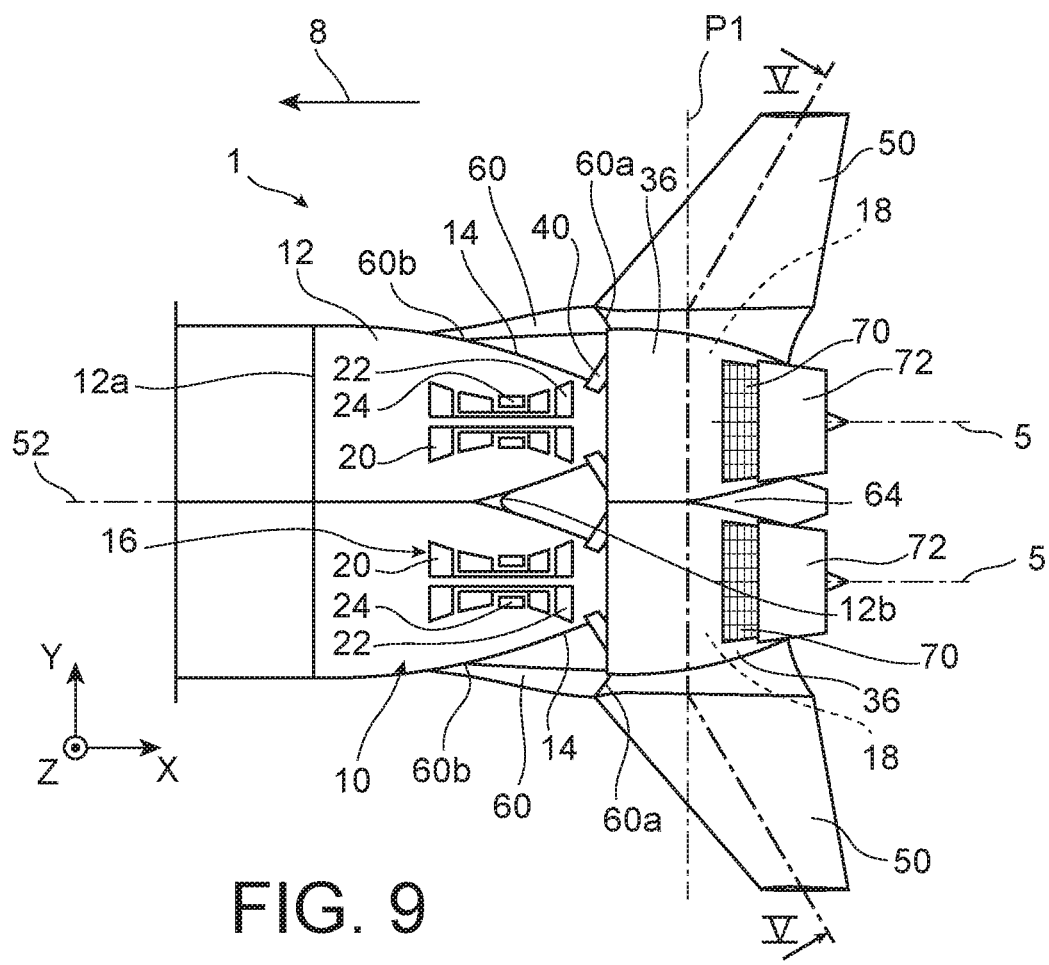
FIG. 9 is a top view of the assembly shown in FIG. 8.

FIGS. 8 and 9 illustrate the fact that the nacelle comprises means of thrust reversal, which are the grids 70 here, covered in the inactive position by one or more cowls 72 able to move in translation along the direction X. A movement by rotation or another movement may also be provided. Preferably, there are provided two grids 70, arranged respectively at the top and bottom of the nacelle, or at the 12 o'clock and 6 o'clock positions, so that the reversed thrust flow will not perturb the air flow provided laterally on the empennages 50.

Figure 10:
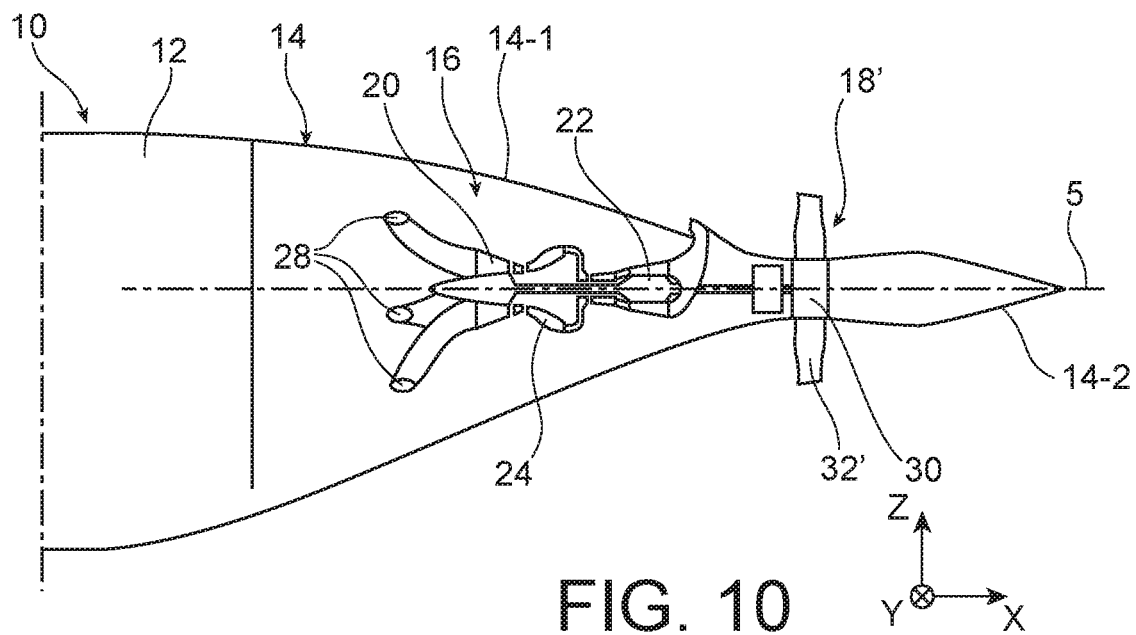
FIG. 10 is a cross-sectional view similar to that of FIG. 6, with the assembly being according to yet another preferred embodiment of the invention.

Finally, it is noted that another preferred embodiment might comprise having turboprop type engines, in which the receiver is a propeller 18' as shown schematically in FIG. 10, with uncased blades 32' and preferably having variable timing, in particular to provide a thrust reversal function. A solution with electric motor could likewise be contemplated to drive the receivers, without departing from the scope of the invention.

Of course, various modifications may be provided by the person skilled in the art for the invention that has just been described, solely by way of nonlimiting examples. In particular, the embodiments which have been described above are not mutually exclusive, but rather may be combined with each other.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for aircraft comprising:
    a rear portion of a fuselage,
    at least two engines with propulsion by boundary layer ingestion circulating on the rear portion of fuselage,
    each engine comprising a receiver equipped with a rotary ring from which bladed elements project radially to the outside,
    said rear portion of the fuselage including a front portion which splits up into at least two distinct rear portions, spaced apart from each other, and each distinct rear portion integrates the rotary ring of one of said engines interposed between a front piece of the rear portion and a rear piece of the rear portion, wherein each rotary ring and the corresponding distinct rear portion are centered about common longitudinal axes,
    wherein each rear portion comprises in succession, from front to rear:
        a front piece of the fuselage with a shape converging toward the rear;
        the rotary ring; and
        a rear piece,
    wherein the rear piece has a converging shape wherein a cross-sectional area of a first portion of the rear piece adjacent the rotary ring is less than a cross-sectional area of a second portion of the rear piece aft of the first portion of the rear piece.

2. The assembly as claimed in claim 1, wherein the receivers of said engines are spaced apart from each other along one of a transverse direction or along a height direction of said assembly.

3. The assembly as claimed in claim 1, wherein each receiver is a fan surrounded by a nacelle joined to the associated rear portion of fuselage, by means of at least one of front support arms or outlet guide vanes.

4. The assembly as claimed in claim 3, wherein at least one of
    each nacelle is structural and designed in order to ensure a transmission of the forces coming from one or more empennages of the assembly, in the direction of the associated rear portion of fuselage, or
    the assembly comprises at least one force transfer beam between an empennage and the rear portion of fuselage.

5. The assembly as claimed in claim 3, wherein the nacelles are mechanically joined to each other.

6. The assembly as claimed in claim 1, further comprising two empennages.

7. The assembly as claimed in claim 6,
    wherein each receiver is a fan surrounded by a nacelle joined to the associated rear portion of fuselage, by means of at least one of front support arms or outlet guide vanes, and
    wherein the two empennages and the nacelles have the same imaginary transverse plane of the assembly passing through the two empennages and the nacelles.

8. An aircraft comprising an assembly as claimed in claim 1.

9. An assembly for aircraft comprising:
    a rear portion of a fuselage,
    at least two engines with propulsion by boundary layer ingestion circulating on the rear portion of fuselage,
    each engine comprising a receiver equipped with a rotary ring from which bladed elements project radially to the outside,
    said rear portion of the fuselage including a front portion which splits up into at least two distinct rear portions, spaced apart from each other, and each distinct rear portion integrates the rotary ring of one of said engines interposed between a front piece of the rear portion and a rear piece of the rear portion, wherein each rotary ring and the corresponding distinct rear portion are centered about common longitudinal axes,
    wherein each engine comprises a gas generator driving the receiver of said engine, said gas generator comprising a compressor assembly, a combustion chamber and a turbine assembly, said gas generator disposed in front of the receiver,
    wherein each engine has an inverted design in which the turbine assembly is situated in front of the compressor assembly, orifices for evacuation of exhaust gases through the rear portion of fuselage disposed in front of the gas generator,
    wherein each rear portion comprises in succession, from front to rear:
        a front piece of the fuselage with a shape converging toward the rear;
        the rotary ring; and
        a rear piece,
    wherein the rear piece has a converging shape wherein a cross-sectional area of a first portion of the rear piece adjacent the rotary ring is less than a cross-sectional area of a second portion of the rear piece aft of the first portion of the rear piece.

* * * * *